United States Patent
Rubenstein et al.

(10) Patent No.: US 9,667,735 B2
(45) Date of Patent: May 30, 2017

(54) CONTENT CENTRIC NETWORKING

(71) Applicant: Infinio Systems Inc., Cambridge, MA (US)

(72) Inventors: Daniel Rubenstein, New York, NY (US); Vishal Misra, New York, NY (US); Hanhua Feng, Perry Hall, MD (US); Martin C. Martin, Bedford, MA (US)

(73) Assignee: Infinio Systems, Inc., Cambridge, MA (US)

( * ) Notice: Subject to any disclaimer, the term of this patent is extended or adjusted under 35 U.S.C. 154(b) by 357 days.

(21) Appl. No.: 14/210,717

(22) Filed: Mar. 14, 2014

(65) Prior Publication Data

US 2014/0280689 A1    Sep. 18, 2014

Related U.S. Application Data

(60) Provisional application No. 61/789,547, filed on Mar. 15, 2013.

(51) Int. Cl.
| | |
|---|---|
| G06F 15/173 | (2006.01) |
| H04L 29/08 | (2006.01) |
| G06F 17/30 | (2006.01) |
| H04N 21/2183 | (2011.01) |

(52) U.S. Cl.
CPC .... *H04L 67/2842* (2013.01); *G06F 17/30132* (2013.01); *H04N 21/2183* (2013.01)

(58) Field of Classification Search
CPC ........... H04L 67/2842; G06F 17/30132; G06F 15/17331; G06F 17/20132; H06F 15/1733; H06F 15/17331; H04N 21/2183

USPC ......................................................... 711/129
See application file for complete search history.

(56) References Cited

U.S. PATENT DOCUMENTS

| | | | | |
|---|---|---|---|---|
| 5,432,776 A | * | 7/1995 | Harper | H04L 12/14 370/252 |
| 9,021,478 B1 | * | 4/2015 | Wan | G06F 9/455 718/1 |
| 9,104,326 B2 | * | 8/2015 | Frank | G06F 3/061 |
| 2002/0048269 A1 | * | 4/2002 | Hong | H04L 29/06 370/389 |
| 2002/0143984 A1 | * | 10/2002 | Hudson Michel | G06F 17/30902 709/238 |
| 2009/0287835 A1 | * | 11/2009 | Jacobson | H04L 67/104 709/229 |

(Continued)

*Primary Examiner* — Chris Parry
*Assistant Examiner* — Stephen Houlihan
(74) *Attorney, Agent, or Firm* — Nields, Lemack & Frame, LLC

(57) ABSTRACT

A caching system is provided. The computing infrastructure runs off of a centralized storage, and data stored on the centralized store can also be retrieved from nearby machines that are part of the local infrastructure and have recently accessed the centralized store. Address-to-digest mappings are used to find an index of the desired data block. That digest is then used to hold where the data block is being cached. In some embodiments, the digest is hashed and the hash of the digest is used to determine where the data block is being cached. The data block is accessed from the cache using its cache, therefore different addresses may result in the retrieval of the same data block. For example, in a virtual machine environment, two different nodes may retrieve the same data block using different addresses.

15 Claims, 4 Drawing Sheets

(56) References Cited

U.S. PATENT DOCUMENTS

| | | | | |
|---|---|---|---|---|
| 2012/0158973 A1* | 6/2012 | Jacobson | .......... | H04L 29/12613 |
| | | | | 709/227 |
| 2012/0317307 A1* | 12/2012 | Ravindran | .......... | H04L 12/6418 |
| | | | | 709/238 |
| 2013/0227209 A1* | 8/2013 | Czerkowicz | ...... | G06F 17/30097 |
| | | | | 711/104 |

* cited by examiner

CONTENT CENTRIC NETWORKING

This application claims priority of U.S. Provisional Patent Application Ser. No. 61/789,547, filed Mar. 15, 2013, the disclosure of which is incorporated by reference in its entirety.

FIELD

This disclosure relates to data retrieval over a network from any or every source at which that data is available.

BACKGROUND

Much of the data transferred across conventional networks is redundant. In particular, various data items are often delivered to multiple destinations, sometimes simultaneously, and sometimes at different times. Examples of data items that experience such redundancy are media files (movies, videos, audio), executable files, and shared data files. Additionally, sometimes two distinct data items share common subcomponents. For instance, two large videos may contain a common clip, or have a common underlying music theme; documents may quote text from an identical source; virtual machines may have significant common memory components (e.g., operating system kernels), or executables may share similar configuration files. The sharing may also be purely coincidental, e.g., a contiguous chunk of 0's, shared code libraries within distinct executables, etc.

Hence, the data desired by client, while originating and made available by an original source, can be available in full or in part at other client, locations. These other clients might be explicitly configured to hold the content (e.g., mirror servers), or they might have the content due to their own request and retrieval.

The original Internet was not designed to facilitate retrieval of data from any or all locations at which it was available, but rather from a known location. Various technologies have enabled the extension to multiple source locations (e.g., DNS redirection, Peer-to-peer [P2P] networking). What, is needed is a content-centric networking, were the desired data, in full or in part, may be retrieved from any or every source at which that data is available.

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction, or "virtualization," of an actual physical computer system.

A virtual machine (VM), which in this system is a "guest," may be installed on a "host platform," or simply "host," which includes system hardware and one or more layers or co-resident components comprising system-level software, such as an operating system (OS) or similar kernel, virtual machine manager (VMMs), or some combination of these. As software, the code defining VM will ultimately execute on the actual system hardware.

As in almost all computers, this system hardware will typically include one or more CPUs, some form of memory (volatile and/or non-volatile), one or more storage devices such as one or more disks, and one or more devices, which may be integral or separate and removable. In many existing virtualized systems, the hardware processor (s) are the same as in a non-virtualized computer with the same platform, for example, the Intel x86 platform. Because of the advantages of virtualization, however, some hardware vendors have proposed, developed, or released processors that include specific hardware support for virtualization.

Each VM will typically mimic the general structure of a physical computer and, as such, will usually have both virtual system hardware and guest system software. The virtual system hardware typically includes at least one virtual CPU, virtual memory, at least one storage device such as a virtual disk, and one or more virtual devices. All of the virtual hardware components of a VM may be implemented in software to emulate corresponding physical components. The guest system software typically includes a guest operating system (OS) and drivers as needed, for example, for the various virtual devices.

A significant problem faced by the designers of present day computer systems employing modern processors operating at high clock rates is to provide a large amount of memory at reasonable cost while achieving a high system performance. Particularly, modern processors operate at such high clock rates that a memory system oftentimes cannot provide code and/or data at these rates thereby retarding system performance. And while this problem is acute when it involves relatively quick memory, i.e., Dynamic Random Access Memory (DRAM), the problem is further exacerbated when it involves slower memory, i.e., disk drives or systems, which are often essential in computer systems, employing virtual operating systems.

A cost effective, prior art solution to this problem of coupling a computer system to a disk system is to provide a cache for disk within memory. A cache is a relatively small-sized but high-speed memory placed between the computer and the larger-sized but slower disk storage.

The operating principle of the disk cache is the same as that of a central processing unit (CPU) cache. The first time a program or data location is addressed, it must be accessed from the lower-speed disk. Subsequent accesses to the same code or data are then done via the faster cache, thereby minimizing its access time and enhancing overall system performance.

A computer system having a central processor (CPU), main system memory, and host adapter may all be interconnected by system bus. The host adapter serves as an interface between the computer system and an input/output device, i.e., a disk or array of disks, typically through the use of a standard logical/electrical protocol, e.g., Small Computer System Interface (SCSI), or NFS.

In this prior art system, the computer system is interfaced via NFS to a disk array system having one or more magnetic disks organized as an array, through an array control unit, having an array controller and a cache memory system.

In such a prior art system, the processor issues commands (READ, WRITE, etc.) to the disk array system. For example, in the case of a READ command, if the information requested is immediately in the disk cache, the information requested is immediately forwarded to the processor by the array controller over the NFS bus to the host adapter. If the information is not in the cache, the controller retrieves the information from the disk array, loads it into the cache, and forwards it to the processor.

Since all disk cache memory systems are of limited capacity, the disk cache often fills and some of its contents have to be changed as new code/data are accessed from the slower disk storage. A primary objective for a designer of a system utilizing disk cache, therefore, is to have the code and data most likely to be needed at a given time available in the disk cache—accesses can then use the fast cache rather than the slower disk storage. When accessing of the cache allows retrieval of necessary data from the disk cache, it is called a "hit", and when retrieval of necessary data cannot be performed, it is called a "miss". The average hit times per times is called a "hit ratio".

One of the most important decisions facing the designer of a disk cache, therefore, is the choice of the disk cache replacement strategy. The replacement strategy determines which disk blocks are removed from the disk cache at a given time thereby making room for newer, additional disk blocks to occupy the limited space within the disk cache. The choice of a replacement strategy must be done carefully, because the wrong choice can lead to poor performance of a disk system, thereby negatively impacting an overall computer system performance.

A number of different methods to manage disk cache replacement has been used in the art, for example, J. T. Robinson and M. V. Devarakonda, "Data Cache Management. Using Frequency-Based Replacement", Performance Evaluation Review, Vol. 18, No. 1, May 1990.

Perhaps the simplest replacement strategy employed in the art is the first-in, first-out (FIFO) strategy. This strategy replaces the resident disk block that has spent the longest time in the cache memory. Whenever a block is to be evicted from the disk cache, the oldest block is identified and removed from the cache.

In order to implement the FIFO block-replacement strategy, a cache manager must keep track of a relative order of the loading of the blocks into the disk cache. One prior art method for accomplishing this task is to maintain a FIFO queue of blocks. With such a queue, the "oldest" block is always removed, i.e., the blocks leave the queue in the same order that they entered it.

A serious drawback arises through the use of the FIFO strategy however. By failing to take into account the pattern of usage of a given block, FIFO tends to throw away frequently used blocks because they naturally tend to stay longer in the disk cache. Although relatively easy to implement, FIFO is not a first choice replacement strategy for disk cache designers.

As suggested by its name, the least-recently-used (LRU) replacement strategy replaces a least-recently-used resident block. Generally speaking, the LRU strategy performs better than FIFO. The reason is that LRU takes into account the patterns of program behavior by assuming that the block used in the most distant past is least likely to be referenced in the near future. When employed as a disk cache replacement strategy, the LRU strategy does not result in the replacement of a block immediately before the block is referenced again, which can be a common occurrence in systems employing the FIFO strategy.

Unfortunately, implementation of the LRU strategy may impose much more overhead on the disk cache system than can be reasonably handled by software alone. One possible implementation is to record the usage of blocks by means of a structure similar to a stack. Whenever a resident block is referenced, it is retrieved from the stack and placed at its top. Conversely, whenever a block eviction is in order, the block at the bottom of the stack is removed from the disk cache. A similar effect may be achieved by putting the blocks into a circular list and including a "recently used" bit for each block. The latter is set whenever the block is accessed. When it is time to remove a block, a pointer moves along the circular list, resetting all "recently used" bits until finding a block that has not been used since the last time the pointer reached this part of the circular list.

Maintenance of the block-referencing structure requires its updating for each and every block reference. In other words, the overhead of searching the stack, moving the referenced block to the top, and updating the rest of the stack accordingly must be added to all disk references. Similarly, the circular list must be maintained, for each block accessed. As a result, cache designers oftentimes implement a pure LRU replacement strategy with extensive and dedicated hardware support for the described stack operations.

A more efficient software implementation and management of a disk cache system is known. It is implemented in a storage subsystem having, preferably, an array of selectively accessible direct access storage devices (disks), a processor, program memory, cache memory, and non-volatile memory and is responsive to commands received, from at least one external source.

In response to the commands received from the external source, i.e., WRITE, READ, the storage system transfers data, preferably organized as blocks, to/from the direct access devices to/from the external source, as indicated. In order to speed access to the data, the blocks are held in an intermediary cache—when possible. Blocks which are the subject of a READ request and present in the cache, are transferred directly from the cache to the external source. Conversely, Blocks which are the subject of a READ request and are not present in the cache, are first transferred from the direct access devices to the cache. Finally, blocks which are the subject of a WRITE request are stored in the cache, and subsequently flushed to the direct access devices at a convenient time.

Viewed from one aspect, that prior art is directed to a method and apparatus for determining whether a particular block (i.e., an atomic unit of data) which is the subject of a READ request is present in the cache at a particular time. The method employs a hashing function which takes as its input a block number and outputs a hash index into a has table of pointers. Each pointer in the hash table points to a list of digests, with each digest having a bit map wherein the bits contained in the map identify whether a particular block of data is contained within the cache. Upon entry into the hash table, the digests are searched. If no digest is found that contains the particular block, a cache "miss" occurs, at which point in time an available space is made within the cache to hold the block and the block is subsequently retrieved from the direct access device and stored within the cache. Conversely, if a digest is encountered during the search of linked digests having a bitmap confirming that the particular block is a valid block, then a cache "hit" occurs and the block is transferred from the cache.

The heap is modified in order to ensure that the most likely candidate (least-frequently-used/oldest) is always at the root of the heap. This is accomplished by performing a local reorganization of the heap every time a cache line is utilized. When a cache line is about to be accessed, i.e., data blocks will be read from or written into the cache line, the cache line is not removed from the heap. Instead, the cache line is marked as being in a busy state thereby preserving its position within the heap and ensuring that the data blocks within the cache line cannot be accessed by another READ or WRITE process simultaneously.

Upon completion of the access, the cache line is freed from its busy state and a frequency-of-use indicator and a timestamp—both associated with the cache line, are updated to reflect this access. Subsequently, a local reorganization (reheap) of the heap takes place beginning at a current location of the cache line in the heap. Upon completion of the reheap operation, the most likely candidate for replacement occupies the root of the heap.

An improved method of retrieving data over a network from any or every source of that data would be beneficial.

SUMMARY

In a first embodiment, a caching system is provided. The computing infrastructure runs off of a centralized storage, and data stored on the centralized store can also be retrieved from nearby machines that are part of the local infrastructure and have recently accessed the centralized store.

In a second embodiment, a caching system is provided that utilizes flash memory (SSDs), whereby the system's explicit role is to reduce and distribute the writing of data on the SSDs to extend their lifetimes.

In a third embodiment, a wide-area file system is provided, where a user can request a file and data associated with that file from anywhere that parts of the data might exist.

For the first and second embodiments, Interface Mechanisms have been developed to affect. "pass-through" where there is no or minimal additional delay compared to retrieving the content from the original source point. These need to interface with various configurations (e.g., NFS, SCSI, Fiber channel, etc.)

Block Store Design

The system is designed to handle large (multi-gigabyte-sized) files. In an embodiment, the system utilizes a novel hierarchical/recursive chunk-store design to facilitate description/comparison/exchange of these large files. In a traditional chunkstore, a file is partitioned into chunks (a.k.a. blocks): each block is hashed, and the chunk can be referred to uniquely by the hash. A hash recipe is the concatenation of these hash values. Across the network, nodes can refer to chunks and identify duplicates by exchanging and comparing the hashes.

For gigabyte-sized files, the hash recipe itself can grow quite large (megabytes). Thus, exchange of these recipes themselves needs to be managed across the network. The system extends this notion by treating the hash recipe itself as a file. A similar hashing scheme is then applied to this file to reduce the cost of delivering/exchanging it across the network.

DETAILED DESCRIPTION

Installation of the System

In a VM environment, the system VM is implemented as a separate virtual machine at each server, and offers network and disk connections to each of the "guest" virtual machines. The "guest" virtual machines, which would normally connect to actual network and disk interfaces (or virtualized interfaces that almost directly connect to the actual interfaces), instead connect to the system virtualized connections. This enables the system VM to view all requests by the other guest VMs to disk and network resources. Installing the system VM in this manner facilitates compatibility across different platforms. For example, the system VM can operate across underlying Operating Systems. The System VM is a software program, stored in a memory device and operating on one or more central processing units. The System VM may implement all of the cache and caching policies described herein.

Recursive Hash Labeling

A mechanism to refer to a (contiguous) block of data (i.e., a labeling) is provided, so that a request for its retrieval can be made. Instances are a persistent filename or a hash for a block of data. As an improvement to deduping (the process of ensuring that only one copy is maintained per distinct, block), a method of recursive hash labeling has been developed.

Figure 1:
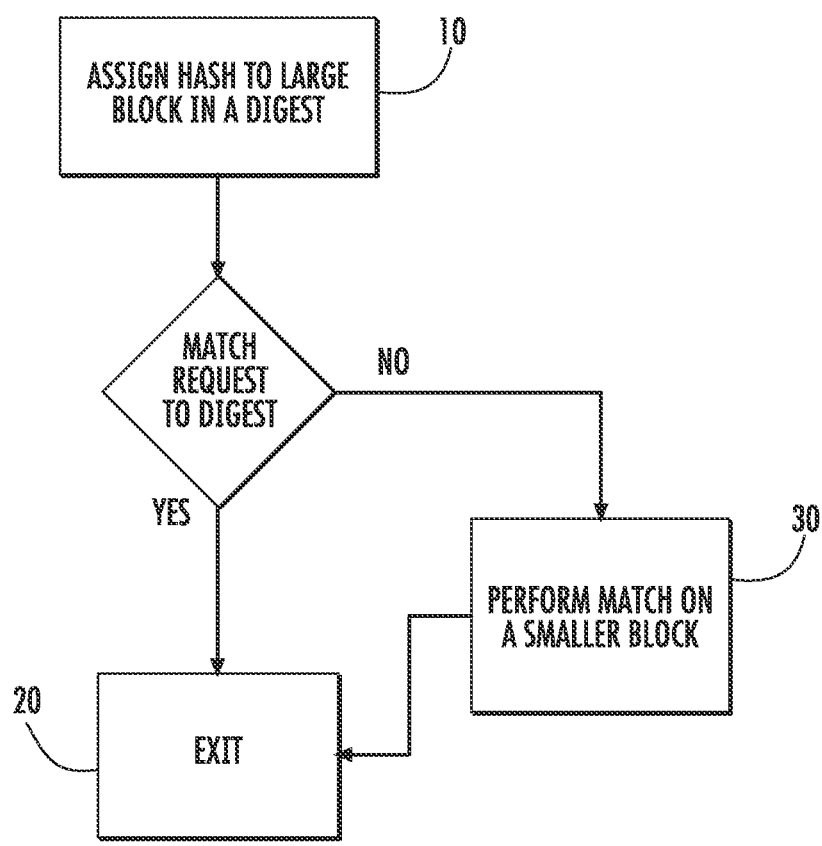
FIG. 1 is a flow chart describing a recursive hashing mechanism.

In contrast to prior work on digests assigning a small-byte unique hash to a larger block of data), where the blocks can be fixed or variable in size, a hashing mechanism that is a recursive hash procedure is disclosed. As shown in FIG. 1, blocks of a larger size are given a digest (Box 10). If the digest matches, then there is no need to recurse to a digest for the smaller block (Box 20). If the match fails, then matches can be performed on smaller-sized blocks (Box 30). This is useful when a small-sized block is needed to increase the likelihood of matches, but were matches on larger blocks can reduce search-and-find operations. This is especially useful in the VM context, where large portions of VMs and their associated files can match.

Pass-Through Interface Mechanisms

The decision where to store content depends heavily on the performance metrics that require optimization. In some embodiments, reducing the number of I/O operations per second (IOPs) at the filer (or storage array) is the primary, most important metric. However, there are secondary metrics that also need consideration, including: Bandwidth utilized (i.e., to deliver blocks of data), latency delivery of a requested block, distributing the load of served requests (e.g., encouraging or limiting bursts from a single point), distributing recent/relevant cached items and accounting for heterogeneity.

In one embodiment, the most important secondary objective is to minimize bandwidth, where latency requirements will be satisfied, and other issues (e.g., distribution of load) will happen naturally.

Caching: Direct V. Indirect (a.k.a. Affinity)

Direct caching implies that a block's cache location is determined by a fixed function that maps the block to a particular node. This facilitates the lookup process: the node searching can directly contact the node responsible for having a given block. Shortcomings of this approach are as follows. First, the node that caches the block might not be the node that uses the block (thereby requiring bandwidth to move the block back and forth). A second, minor issue is determining the destination for the block. When the block is first retrieved, from the storage array, either it is sent to the caching node or the node that needs the block. The former delays receipt at the node with demand, the latter initially delays access to the block from the cache.

There is the expectation that the most likely accessor of a block is a node that has previously accessed the block. Thus, from a perspective of minimizing bandwidth, it makes sense to attempt to cache the block where it was utilized. Additionally, if the block is never requested a second time, no bandwidth was wasted moving it from the demanding node to the caching node.

Indirect caching implies that the location in the cache of the stored block is more arbitrary (e.g., the node who needs it, or moved, to an underloaded node, etc.). A (possibly) distributed directory service is implemented in which a hash on the digest determines the node responsible for maintaining the directory information for the given block. When a node seeks to retrieve a block associated with a known digest, the node must first query the distributed directory to find the location of the block.

Indirect Caching "Lookup" Functionality (Directory Service)

For indirect caching, a node searching for a block proceeds through a directory lookup service to identify the node that has the desired block: the search through the directory is the level of indirection. The directory lookup service can be one of several embodiments: centralized at one particular location (e.g., single directory server); fully replicated (each node maintains a mirror); distributed (i.e., each node is responsible for a subset of the directory) via employment of a hash function; or hybrid (e.g., distributed, but where each block's location info can be retrieved at multiple nodes, perhaps by using multiple hash functions or assigning designated mirrors per node).

A centralized directory has the drawback that a failure at the server will bring down the entire system infrastructure. The pros/cons of distributed over fully-replicated are:

Pro: less update bandwidth (fewer updates)
Pro: fewer consistency issues (updating all nodes with current info)
Con: extra hop during lookup (directory information, not local most of the time)
Con: more "search" bandwidth The replicated directory can reduce latency on lookup, but top issues are (1) number of disk seeks, (2) amount of bandwidth consumed on the LAN, and (3) amount of RAM available for caching. A replicated directory does not appear to positively affect any of these.

Note that, in this scenario, update bandwidth is expected to be much greater than search bandwidth.

A preferred embodiment may employ a distributed approach. This reduces consistency issues and latencies are acceptable.

Since the primary objective is to reduce bandwidth, indirect caching is preferred. However, a simple design which reduces bandwidth can easily be adapted to a hybrid of direct/indirect caching or full direct caching.

Figure 2:
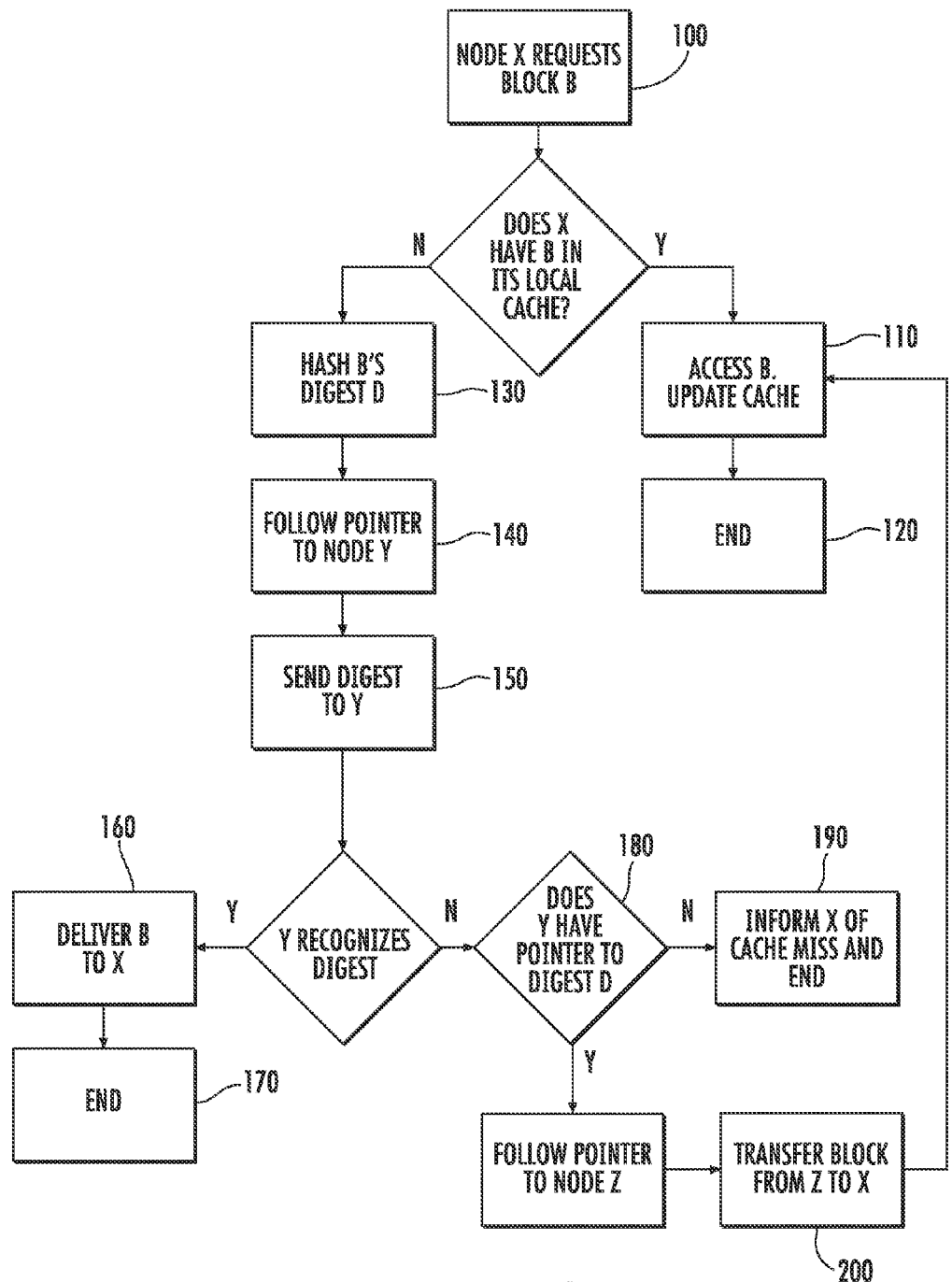
FIG. 2 is a flow chart depicting indirect caching.

FIG. 2 shows a high-level view of a caching process. In this configuration, it is assumed that there are at least three nodes (Nodes X, Y and Z), each possessing its own cache. Each also has at least a portion of a distributed directory service which informs the node of the location of various blocks and digests.

In Box 100, Node X requests a block B, whose digest is D(B) (which is written as D when the associated B's implication is obvious). The hash on the digest, h(D(B))=h (D) or just h when D(B)'s implication is obvious, points to another node Y, i.e., h(D)=Y.

If Node X already has block B in its local cache, the request is satisfied locally. The cache must be updated to reflect the recent access of block B by Node X (Box 110), which may be useful if a LRU algorithm is used. The cache access is then complete (Box 120).

If Node X does not have block B in its local cache, Node X hashes block B (Box 130) to determine the caching node, Y (Box 140). Node X then sends a request containing digest D to Y (Box 150).

If Node Y recognizes the digest and has block B, it delivers block B to Node X (Box 160). The cache access is then complete (Box 170).

If Node Y does not recognize the digest, Node Y checks for a pointer to D registered to another node, such as node Z (Box 180). If Node Y does not have a pointer to digest D, Node Y informs Node X of a cache miss (Box 190). Optionally, Node Y can issue a read from the storage array on behalf of Node X. The block is then fetched from the storage array. After the block is fetched from the storage array (based on a request from either Y or X), the pointer to B resident in node X is registered at Y. The cache resident in Node Y is updated to reflect the recent access of block B by Node X.

If Node Y has the pointer to another node (such as to Node Z), the block B is transferred from Node Z to Node X (Box 200).

One way to affect the block transfer is for Node Y to inform Node X of Node Z and then have Node X issue a request to Node Z for the block B. Alternatively, Node Y can inform Node Z to deliver the block B to Node X. The latter approach may be recommended since:

the number of network hops to implement the transfer is reduced; and

Direct/indirect transfers can both be handled in this manner (Node X simply expects delivery of a block).

However, one disadvantage is that an additional connection must be established between Node Z and Node X.

Block B/Digest D is registered in the distributed cache as having recently been accessed. Where the block is "registered" is an issue. Some possible approaches are as follows.

The block can stay registered at Node Z.
The block can be registered at Node X.
The block can be registered at Node Z and Node X.

The decision on where to register the block B can depend on many factors:

Keeping the block registered at Node Z eliminates the need to update the pointer info at Node Y.

Since Node X is the more recent accessor of the block, there is (perhaps) a greater likelihood that Node X will be the next accessor, so moving the registration to X may be preferable. Updating the pointer takes minimal effort since presumably Node Y is already aware of Node Z's transfer of the block B to Node X.

The policy may also consider the relative statuses of the caches at Node X and Node Z. For example, information, such as how large the caches are, how old the information living in the cache is, the loads actively being placed on Node X and Node Z, and other information may be used to determine where the block B should be registered.

The block can be kept at both Node X and Node Z (e.g., if the block is known to be under heavy demand) so that request load for the block is balanced between Node X and Node Z. Also, if Node X and Node Z are constantly demanding the block, no network traffic would be generated.

The notion of a "Master" block will now be introduced. A copy of a block may exist at multiple locations within the distributed cache. However, a subset of these copies may be labeled as "Masters". Usually, a single copy will be the master. The master copy will generally have additional properties and requirements associated with it. For instance, a node holding a non-master copy can remove it from the cache without notifying other parts of the cache, whereas a master copy must receive appropriate distributed permissions for its removal. So long as a master copy is not removed, this ensures that a copy will continue to exist in the cache, even when non-master copies are deleted. Note that the assignment of "master" to a copy is also movable. For instance, Nodes X and Y might both hold a copy of a block B, with Node X holding the master copy and Node Y the non-master copy. Later, the master responsibility might move from Node X to Node Y, such that Node Y now holds the master copy instead of Node X. Additionally, a master block can be moved from a Node X to a Node Z that has no copy of the block. For instance, Node X may need to cache a newly arriving block, while Node Z may have extra space within its cache.

It may be preferred that the block be kept at both Node N and Node Z, and Node X and Node Z be permitted to run their respective caches according to an LRU policy where an "access" is either a local access or a request across the network.

When multiple nodes contain the block, the following considers to whom Node Y should forward a request:

(weighted) Round-robin policy: the load is distributed among nodes that have the block. Heavy request loads for the block will keep the block active in both caches, but light request loads could lead to faster evictions (if the caching policy takes into account the frequency of access, i.e., this should not affect LRU);

Random: similar to round-robin in terms of performance;

Prioritized: keeps heavily-accessed items "fresh" in the cache.

Ensuring Consistency/Race Conditions During Cache Updates

Figure 3:
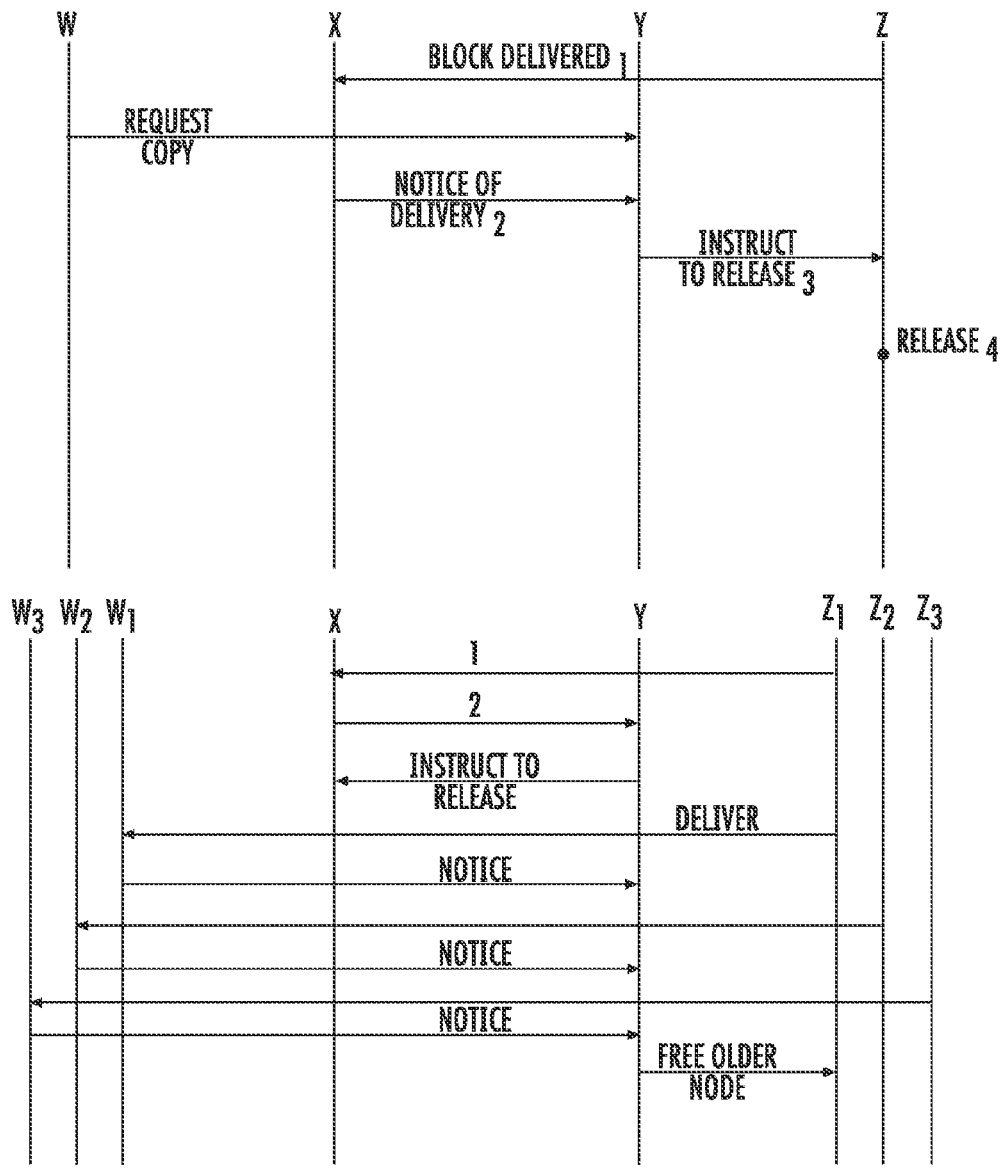
FIG. 3. is a timing diagram for consistency during cache updating.

Consider the path of the communication X→Y→Z→X (Node X requests location of block from Node Y, who forwards request to block holder Z, who delivers the block to Node X). Assume that the block is then moved from Node Z to Node X (i.e., erased from Node Z's cache and inserted in Node X's). Node Y needs to be updated with the location information of the new block. To ensure consistency, several "rules" are provided regarding the order in which updates occur to ensure Node Y's information is timely. The sequence of steps in the above scenario is shown in FIG. 3A.

Step 1. Node Z delivers the block to Node X.

Step 2. Node X notifies Node Y that it now has the block.

Step 3. Node Y notifies Node Z that it can release the block.

Step 4. Node Z releases the block.

A complication may arise if, as shown in FIG. 3A, prior to the completion of step 2, another request arrives at Node Y from some Node N for a copy of the block. From Node Y's perspective, Node X is not yet "ready" to serve the block, hence Node Z will have to serve an additional block to prevent delay.

In these parallel instances, it may be possible to "alter" or "deviate" from the general policy. For instance, assume that only the "newest" receiver of a block is supposed to cache a copy of that block. This can be strictly enforced as follows:

Steps 3 and 4 recited above may be altered. For example, instead of Node Z being told to release the block, Node X is told to release the block. The process then returns to step 1, where Node Z is delivering the block to Node W1, as shown in FIG. 3B. However, if a swarm of requests come for the block, such as from Nodes W2 and W3, Node Z can become overloaded, whereas other nodes (e.g., Node X) could have helped offload. During simultaneous deliveries, multiple copies can be maintained, with Node Y assigning delivery to the node with the fewest active deliveries (such as Nodes Z2 and Z3). Node Y can then choose to free "older" nodes (Step 5) as long as a sufficient number of newer nodes exist to handle additional requests.

An alternative to a directory service is to have nodes periodically exchange "summaries" of their cached contents with one another. As a replacement to the directory service, when a node seeks a particular block, it checks its summaries for the existence of the block at its neighboring cache nodes. If the summaries indicate that none of the node's neighbors has the block, the block is retrieved from the central storage. If one or more summaries indicates a copy of the block is available from a neighboring node, the node queries a subset of these neighbors for the block. For instance, it might choose one neighbor at random from the set of neighbors claiming to have the block. After performing these queries to neighbors, if the block is retrieved in this manner, the process is complete. If, after performing these queries, the block is not retrieved, the node queries the central store for the block.

Note that a query might be sent to a node that does not have the block if its summary is misinterpreted (i.e., a false positive). The summary must compress the information about the blocks a node has, and in doing the compression, the summary may contain misleading information about the blocks it stores. The goal is to design the summary so that a) it is well-compressed, b) it rarely indicates having blocks it doesn't actually have, and c) it rarely fails to indicate having block it does indeed have.

Bloom-Filter summaries: An efficient method for implementing a summary is to utilize a bloom filter. A bloom filter maps an integer to a set of hash values which are entered into a table. If the block indeed resides in the cache, the bloom filter can confirm its existence (i.e., no false negatives). In contrast, if a block is not in the cache, a bloom filter may still (erroneously) indicate its existence in the cache (i.e., exhibit a false negative). The rate of false negatives can be decreased by increasing the size of the bloom-filter: the goal is to choose the smallest size that exhibits an acceptable false positive rate (e.g., in come embodiments, around 1% is appropriate).

Master-block only BFs: One way to further reduce false positives is to have the bloom filters track only the master block (i.e., copies are not registered within the bloom filter). This can reduce likelihoods of false positives. A downside is that popular blocks, which may exist in several nodes' caches, will not be observable through the summaries.

When to exchange summaries, each nodes' summaries have a timestamp. Whenever nodes exchange data, they exchange timestamps relating all summaries that they hold. If timestamps are different, then they can (optionally) update one anothers' summaries. Note the update rate of sunmaries can be reduced if the transmission of summaries becomes too high.

Summary updates can be a full retransmission of a new summary, or a "delta" that transmits only differences with previous summaries. The node that generates its summaries can keep a table that tracks version A and version B and the overhead of sending a delta (versus just sending the entire summary).

Failsafe

When Node X makes a request for a block via the system, it initiates a clock with a timeout T. If T expires and the block is not available at Node X (either there was no response from the system or the block has not been fully delivered), then Node X sends a request directly to the storage array. T must be small, enough so that the storage array can still deliver the block in time. However, making it larger can only increase the effectiveness of the system cache (giving it more time to complete its delivery).

Disk Stripe Awareness

One goal is to minimize accesses to the storage array. Blocks are grouped into stripes: the atomic access unit of the disk. From an IOP perspective, it may be beneficial to minimize the number of stripes accessed. For example, assume blocks A and B belong to the same stripe S. If block A is accessed at time t1 and block B accessed at time t2, the stripe S is read twice. To reduce the number of stripe accesses, several techniques may be used:

1. Pull and cache an entire stripe whenever a block is requested. This might significantly increase bandwidth, since portions of the stripe may never be needed (or get flushed from the cache before being used).

2. Retain blocks in the cache according to their stripe. A node Z that holds several blocks that correspond to a stripe can utilize a single timestamp for all blocks in the stripe such that they expire from the cache simultaneously (i.e., the timestamp equals the most recent access of any block within the stripe). Thus, none of the blocks in a stripe are removed unless there have been no recent access to any blocks in the stripe.

Additional Observations:

Indirect caching facilitates disk stripe awareness, as the location of blocks in the same stripe should naturally exist at a single location, or, in the case where a background monitor of the distributed cache is used, can be moved to a single location.

Duplicated content (i.e., data that exists at multiple addresses) will often lie in multiple stripes (e.g., Node X and Node Z have the same data at different addresses). It may be worthwhile to keep separate replicas in the cache per stripe. An alternative is to keep the timestamp of the block synchronized across the stripes (e.g., if block is stored at Node X and Node Z's stripe receives an access, the timestamp of block X is updated through Node Y).

Extensions

Direct/Indirect hybrids: When a node Y (in the X, Y, Z example above) decides to be the caching point.

Distributed Cache Awareness: in one embodiment, each node maintains a separate (LRU) caching policy. Another embodiment may want the nodes to exchange information to better implement load-balancing, speed of delivery, etc.

Other Mechanisms

Other mechanisms may also be employed, such as: Fast, efficient (possibly distributed) lookup mechanisms that take as input the labeling of the data and identify its location(s); Fast, efficient delivery mechanisms that effectively balance the load; Caching mechanisms, where various devices might obtain or hold onto content that is no longer or never was required at that location; and Monitoring infrastructure to report various statistics or measures that might be of interest to customers, users, or infrastructure managers.

Virtual Machine Optimization

Virtual machines are supported (by the file system) as a series of various files, where the files can be broken into several classes. Certain classes of files, such as those that contain data, are more easily cached than others, such as those that contain configuration information.

One optimization that the disclosed system enables is the selection, via filename, of the classes of files to cache. Other files permanently are "passed through" the system. As an alternative to the filename, it is possible to monitor the behavior of a file and use this to determine whether the file is cacheable. For example, the frequency of how often a file is accessed and/or written, to may be used to determine whether the file is cacheable.

Novel Cache Replacement Strategies

An analysis of block utilization demonstrates that a large portion of blocks are read only once, while others can be read multiple times. In the disclosed distributed cache, caching strategies have been devised that determine when and where blocks should be held (perhaps even at multiple distributed points). In one embodiment, a 2-phase caching approach is utilized whereby the blocks initially pass through a FIFO queue. If called upon twice, then the blocks are transferred to an LRU-like queue. Note that the relative sizing of these two queues is important, as is the specific policy of the LRU-like queue. For example, in some embodiment, the LRU-like queue is not simply LRU but also considers factors such as number of times and/or frequency of access.

Address-to-Digest Versus Digest-to-Block

In addition to the space needed to access the digest-to-block component, a mapping of the (disk) address to the digest is maintained. Two issues arise when this mapping is created. First, there may be a need to share address-to-digest mappings. However, since presumably each VM instance accesses a unique portion of disk, the addresses may only be of local interest. However, these mappings may be useful during VMotions. The second issue is how to share the cache space between Address-to-Digest (A2D) and Digest-to-Block (D2B) mappings. If A2D space is too large, the A2D map will remain in cache, but the node will still have to go to disk too frequently to retrieve the blocks. If too small, the system may "lose out" on existing duplications (if and when the block is retrieved elsewhere, for some other address).

Big Red Button System Removal

A desired feature of the system is to enable the immediate removal of the cache when requested by the user/administrator. This feature may be referred to as the "big red button"—when the button is pushed, the system removes its functionality, so that its incorporating system returns to its normal, default, operating form. A sudden removal of cache should not affect the correctness of the incorporating system. There are several ways to achieve the removal:

Actual removal of the system VM. For example, the quest VMs may be reconfigured to connect directly to the network and disk systems. The system VM can be shut down, removed, or otherwise disabled.

NAT-like behavior: Requests sent to the system arrive via a network interface (whether for network or disk access). These requests are simply redirected to the network interface where such requests would go were the system VM not installed. In this mode, the system VM acts as a NAT, translating an incoming network address to an appropriate alternate outgoing address.

Revert-to-passthrough: The system module views the insides of the request (e.g., specific to the type of file system utilized), and modifies the request appropriately so that the desired portion of disk is accessed. This mode is necessary if, for some reason, the system stores data on the disk differently than when a regular VM accesses the disk directly. The translation component must remain active.

ChunkStore Deign

Assumptions and Design Goals

Some files have significant commonality. For example, similarly-configured VMs may have commonality. Studies show that chunking into 4 KB blocks is most appropriate. For particular embodiments, no assumptions are made about the size or homogeneity of chunks—only that the hash space can grow quite large and this aggregate size must be dealt with.

When files have significant commonality, so will their hash recipes, but at much finer granularity. For example, 4 KB common blocks in original files maps to 20 bytes commonality in the chunkstore.

Profiling will help identify the order in which file blocks are needed, and even whether needed at all. This information can be used to store partial hash recipes. Specifically, if the entire file is not needed, then neither is the entire recipe. The term "partial" specifically means that if a full hash recipe is X MB long, a hash recipe is partial if less than X MB is available.

The file may need to be transferred before its full hash recipe has been constructed. Thus, a way to make use of incomplete recipes is needed. The term "incomplete" means that certain blocks of the file have not yet been analyzed and placed into the recipe, and a special null hash (e.g., hash value 0) fills the space for the actual hash in the recipe.

Figure 4:
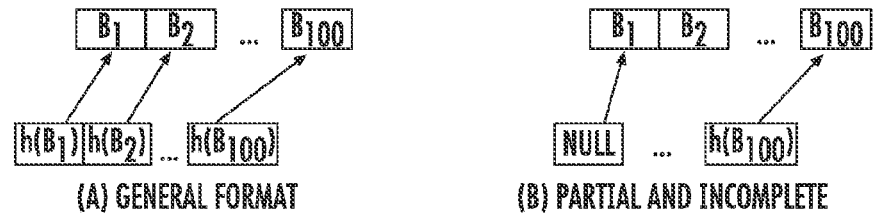
FIG. 4 depicts a full, complete hash recipe and a partial, incomplete recipe.

FIG. 4(a) depicts a full, complete hash recipe. The original file consists of chunks B1 through B100, and the complete, full recipe contains hashes on each of these blocks. FIG. 4(b) depicts a partial, incomplete hash recipe. The hash recipe is considered partial because the hash for B2 has been excluded. The hash recipe is considered incomplete because the recipe component for B1 is included, but is currently the NULL hash. The reason for this configuration may be that B2 is not a high-priority block in the profile (i.e., rarely used), whereas B1 is a high-priority block, but the hash value has not yet been determined.

Hash-Centric High Level View of the System

Each file F is partitioned into blocks B1, ..., Bm. Level-1 hashes are formed on these blocks h(B1), ..., h(Bm) (which can be written as h1, ... hm when the B is implied.) These hashes may also be referred to as hash blocks since they will also be stored within the system.

Recursively, level-l hash (block), represented as $h_i^l$, are defined to be the concatenation of some number, r, (which may most likely be a fixed value) of level-l−1 hashes. Stated differently, $h_i^l = h(h_{j+1}^{l-1} \cdot h_{j+2}^{l-1} \cdot \ldots \cdot h_{j+r}^{l-1})$. The term "r" is defined as the fan-in of level-l, and generally a fixed fan-in is expected across levels.

The highest-level hash covers the entire file in a single block.

In some embodiments, the same hash function h is applied at each level. This is not imperative, so long as (a) the hash function used by each client, at each level is identical, (b) each hash is sufficiently pseudo-random (i.e., patterns do not develop due to use of multiple hashes) and (c) the hashes map to the same range space.

Additionally, the level-1 hash, which can be written as $h^1$ remains identical to h. The level-0 hash is defined as simply the original, data-block itself. It is worth explicitly noting:

The level-0 hash is technically not a hash (i.e., it is the raw data), so the "hash function" applied to this level is simply the identity function.

The number of level-1 hashes equals the number of level-0 hashes. In contrast, the number of level-i+1 hashes is a fraction 1/r of the number of level-i hashes for all i>0 when r is the fan-in of level-ill.

How the System Uses Hash Blocks

This description is a high-level overview of how the system maps hashes no blocks. The critical idea is that a hash value can map to an actual data block, or it can map to any level-m hash block.

The system consists of two "physical" components: the chunkstore where (both data and hash) chunks are actually stored, and the lookup table, which does a mapping φ from a hash value to a location within the chunkstore. The lookup table will generally reside in memory, while the chunkstore can reside in memory or on disk.

The system can take, as input, a hash value h(B) and return the location in the chunkstore, L(B), of the associated block B: φ(h(B))=L(B). For instance, the hash value h(B) of a data block. B, is fed into the lookup table to retrieve L(B). However, one can also feed in a level-m hash $h_i^m$ to retrieve the set of location (s) $\{L(h_j^{m-1})\}$, where $\{h_j^{m-1}\}$ is the set of level-m−1 hashes from which $h_i^m$ is formed.

Recipes and (Filename) Identifiers into the Chunkstore

The discussed embodiments assumed hashes on both data and hashes, and that the lookup table uses these hashes to return the location of lower-level hashes (and data at the lowest level). Further embodiments include an additional item which may be hashed, namely the filename. Given a filename F, the system hashes on the filename h(F), and the lookup table can map this hash to the location L in the chunkstore of the set of blocks that comprise the file. For instance, the location could point to the highest-level (full-file) hash-value.

Example

Consider a file named "/tmp/example" that consists of blocks B1 through B128, and suppose the fan-in for all levels is 2, such that there is a single level-7th hash, $h_1^7$.

Suppose h ("/tmp/example")=14,712. Then the value (of location) $L(h_1^7)$ is stored in lookup table entry 14,712. Thus, a request for "/tmp/example" can be hashed, the hash can be sent to the lookup table, and $L(h_1^7)$ is returned, enabling the client to retrieve the value $h_1^7$ from this location in the chunkstore. Subsequently, locations $L(h_{2j}^i)$ and $L(h_{2j+1}^i)$ can be retrieved by feeding $h_j^{l-1}$ into the lookup table.

Slow "Roll-Out" of the Hash Recipe: Partial Recipes

The multi-level design of the recipe enables a client to retrieve only parts of the recipe (perhaps selectively) and then retrieve the respective chunks whenever another client has a match on that hash, regardless of level. If no match is found, then the client can further "roll-out" the recipe by retrieving (from a neighboring client) additional details of the recipe (i.e., lower-level information). Hence, clients have an easy and effective way to exchange partial recipes.

Dealing with Partial and Incomplete Recipes

A recipe is partial when details of some of the (level-1 or higher) hashes are missing. Partial recipes enable a client to still participate in an exchange (sending and/or receiving) even prior to having the entire recipe.

Incomplete recipes permit the system to deal with files whose data chunks have not yet been completely mapped. In particular, consider attaching a loaded NAS to the system for the first time. The data chunks are readable, but hash values do not yet exist. The system must go through the process of reading the chunks and creating level-1 hashes. Higher-level hashes (in particular, the top-level hash) cannot be created until the entire level-1 hash set is created.

To deal with the possibility that clients may wish to initiate an exchange prior to the completed reading, the notion of incomplete recipes, where NULL values (φ) are used in place of the "correct" hash values, is employed. The NULL value is easily identified (it is safe to assume that no existing chunk will hash to the NULL value).

Higher-level hashes can be built on top of lower-level hashes where some of the underlying chunks (and/or hashes are NULL). These can be exchanged, and as additional data chunks are processed and NULL values are expunged, the hash value for a particular (hash) chunk will be updated. Once a hash value is built on top of a set of data which is complete (no NULL values), that hash value is said to be final or stable as it will not change so long as the underlying data remains unmodified. When a hash is not stable, and is built atop NULL values, it is said to be unstable.

An unstable hash only has limited use, as hashes are only useful as exact matches. Hence, a single update at a lower-level will modify all upper-level hashes that are formed atop this lower-level value. To assist in "merging" two clients' unstable hashes for the same hash value, a bit-vector representation is introduced.

stable-hash-bit S(h): with each hash, S(h)=1 if the hash value is the "final" value for that hash (i.e., the level-0 hashes upon which this value was computed are all non-null. When the bit is 0, it means that some chunk that falls within this hash has not yet been processed.

have-all-blocks-bit H(h): with each hash, H(h)=1 indicates whether all data blocks associated with that hash value are locally stored. When the bit is 0, it means that some chunk that is not locally stored falls within this hash.

H can be generalized to $H_i$, where $H_i(h)$ indicates whether all level-i hashes are received (without implication of whether any lower-level hashes have been received). Hence, H=H0.

Presumably, whenever $H_i(h)=1$ for a hash value h (for any level I less than the level of h), then S(h)=1 (since all data lower-level hashes at level I are available, the stable hash value can be computed). However, S(h) can still be stable even when $H_i$ (h) is not, i.e., some other client could have forwarded the value of the stable S(h) without yet forwarding the (stable) values of the underlying $H_i$ (h).

Figure 5:
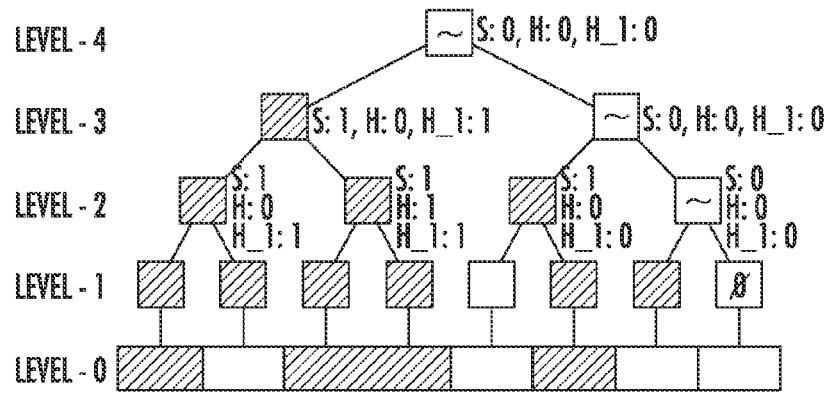
FIG. 5 depicts an instance of a 5 level hash space.
Figure 6:
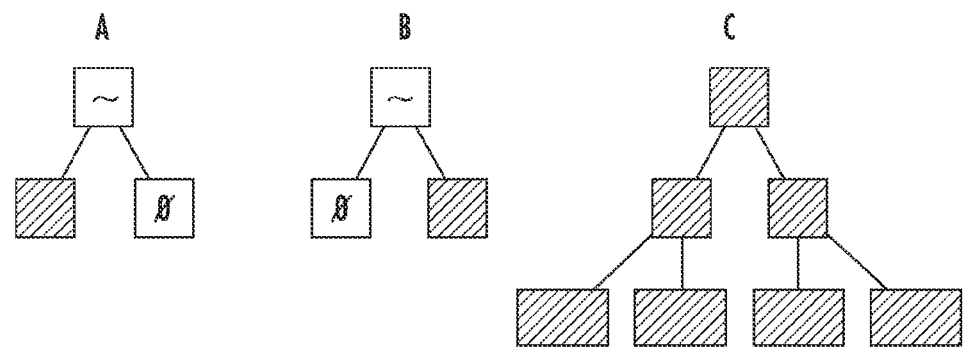
FIG. 6 depicts an example depicting the exchange of recipe information.

FIG. 5 depicts an instance of a client's 5 level (level-0 through level-4) has space. Each row represents a hash-level, with the bottom row being level-0 (data), and the top row (level-4) covering the entire file. A blackened box means that the final, value for that hash (data) is known. Hence, in the example, the client has received data blocks B1, B3, B4 and B6. The client has also received, or perhaps computed various level-i hashes. For instance, $h_2^1$ must have been transmitted as $B_2$ was not received to perform the computation, whereas $h_3^1$ could have been computed directly from block $B_3$ or been received. $h_2^2$ could be received or computed from hashes $h_3^1$ and $h_4^1$ whereas $h_3^2$ must have been received since $h_5^1$ is not available to perform the necessary computation.

An empty box represents a missing (currently uncomputable) hash that this client chooses to omit, from the recipe, i.e., making the recipe partial, such as $h_5^1$. A box filled with a "φ" represents a missing hash that the client, chooses to include in the recipe as a NULL hash (i.e., all 0's). A box with a ~ is an unstable or non final hash, computed from lower hash values that included a NULL hash (e.g., $h_1^4, h_2^3, h_4^2$ all include $h_8^1=\phi$ in the computation).

Values for S, H, and H1 are shown to the right of each hash for the higher levels.

The main use of the stable-hash-bit is to facilitate creation of stable hashes when recipes are incomplete. The main use of the have-all-blocks-bit is for the purposes of obtaining additional parts of a recipe when only a partial recipe has been received.

Using S and $H_1$

Assume that Nodes A and B are interested in same file; and that each has an incomplete view (different) and no underlying data. Node A got its info from one client, Node B from another. Node C has a different file, whose underlying sub-data in this region is the same. But at this point, Nodes A and B don't have the right hash to get data from Node C.

Nodes A and B exchange the recipe info shown, and realize that they can help one another get incomplete recipe info and hence produce stable high-level hash. Once done, they can match with Node C, who (even though different file) can now deliver underlying data to Nodes A and/or B.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modfications are intended to fall, within the scope of the present disclosure. Further, although the present disclosure has been described herein in the context of a particular implementation in a particular environment for a particular purpose, those of ordinary skill in the art will, recognize that its usefulness is not limited thereto and that the present disclosure may be beneficially implemented in any number of environments for any number of purposes. Accordingly, the claims ms set forth below should be construed in view of the full breadth and spirit of the present disclosure as described herein.

What is claimed is:

1. A method for a requesting node to retrieve a data block located within a shared cache, wherein said shared cache comprises a plurality of smaller local caches, each smaller local cache possessed by a respective one of a plurality of nodes, said method comprising:
   maintaining an address-to-digest mapping in said smaller local cache possessed by said requesting node, wherein the data block is located at an address accessible by the requesting node;
   indexing into said address-to-digest mapping using said address of said data block to determine a digest for said data block, where said digest is generated based exclusively on data contained within said data block, where said digest serves as a universal identifier used by all of said nodes to identify said data block;
   using said digest to determine which of said smaller local caches contains said block; and
   retrieving said data block from said smaller local cache containing said block, wherein said data block is identified based on its digest.

2. The method of claim 1, wherein each of said nodes implements one or more virtual machines, and said addresses used in said address to digest mapping disposed in each of said smaller local caches are unique to said respective node possessing each of said smaller local cache.

3. The method of claim 1, wherein said smaller local cache containing said data block is possessed by said requesting node.

4. The method of claim 1, wherein said smaller local cache containing said data block is possessed by a node different from said requesting node.

5. The method of claim 1, wherein further comprising retrieving said data block from said smaller local cache containing said block by a second node, different from said requesting node.

6. The method of claim 5, wherein an address of said data block used by said second node is different than said address of said data block used by said requesting node.

7. The method of claim 1, wherein determining which of said smaller local caches containing said block is performed by generating a hash of said digest, wherein said hash is used to determine said smaller local cache containing said block.

8. The method of claim 7, wherein said shared cache contains a directory lookup service, and said directory lookup service uses said hash of said digest to determine which of said smaller caches contains said data block.

9. A system for indirect caching of data blocks comprising
a network of nodes,
a directory lookup service distributed over a subset of said nodes, said directory lookup service containing location information for said data block,
wherein a hash on a digest for said data block determines a node responsible for maintaining directory information for said data block, and wherein said digest is determined by using a system address of said data block to index into an address-to-digest mapping to determine said digest, where said digest is generated based exclusively on the data contained within the data block and serves as a universal identifier used by all of said nodes to identify said data block.

10. The system for indirect caching of claim 9 wherein said directory lookup service is centralized at one location.

11. The system for indirect caching of claim 9 wherein said directory lookup service is mirrored at each node.

12. The system for indirect caching of claim 9 wherein said directory lookup service is distributed via employment of a hash function with nodes being responsible for a subset of the directory.

13. The system for indirect caching of claim 9 wherein said directory lookup service is distributed with each block's location information retrievable at multiple nodes.

14. The system for indirect caching of claim 13 wherein multiple hash functions locate the multiple nodes.

15. The system for indirect caching of claim 13 wherein designated mirrors are assigned per node.

* * * * *